(No Model.)
J. P. GUY.
MACHINE FOR MAKING HOLLOW EARTHENWARE ARTICLES.
No. 516,969. Patented Mar. 20, 1894.
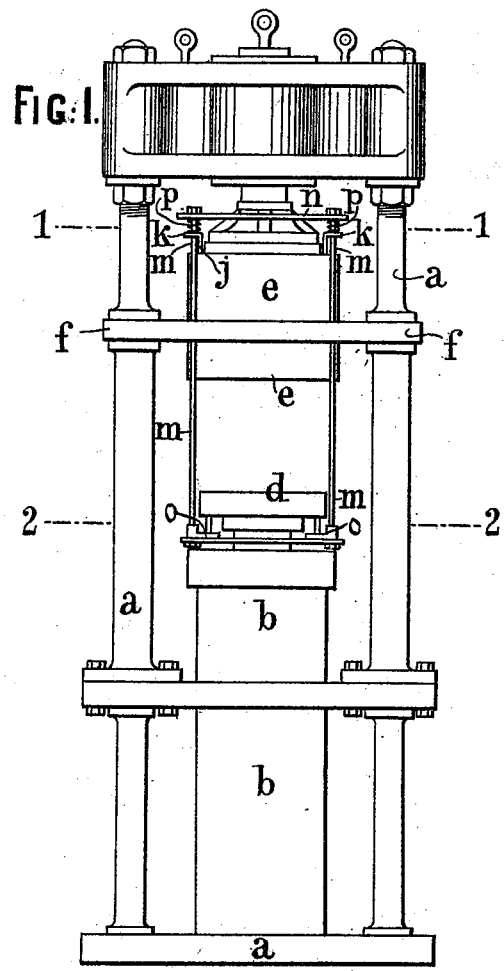
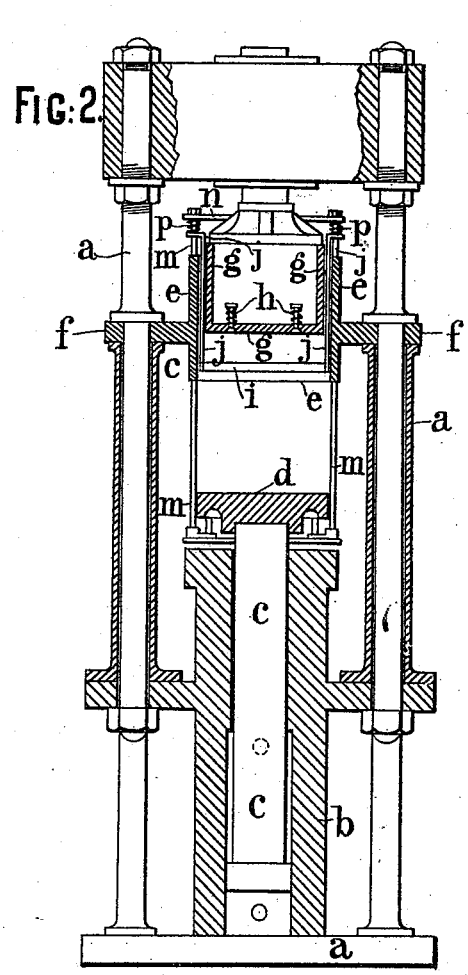
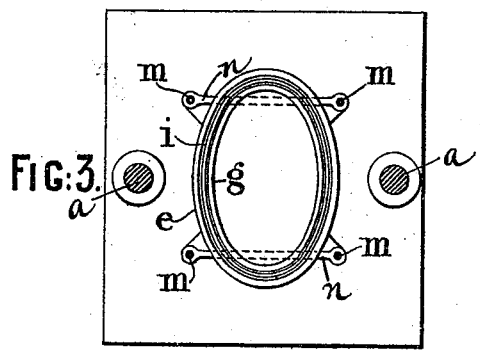
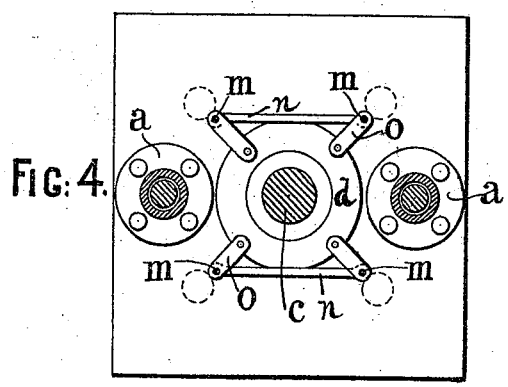
WITNESSES
INVENTOR

United States Patent Office.

JOSEPH PULLAN GUY, OF BURSLEM, ENGLAND, ASSIGNOR OF TWO-THIRDS TO JOHN CUTHBERT BAILEY, OF SAME PLACE, AND ARTHUR PRICE LLEWELLYN, OF TUNSTALL, ENGLAND.

MACHINE FOR MAKING HOLLOW EARTHENWARE ARTICLES.

SPECIFICATION forming part of Letters Patent No. 516,969, dated March 20, 1894.

Application filed August 9, 1893. Serial No. 482,763. (No model.) Patented in England October 25, 1890, No. 17,068.

*To all whom it may concern:*

Be it known that I, JOSEPH PULLAN GUY, manufacturer, a subject of the Queen of Great Britain, residing at Armley House, Burslem, in the county of Stafford, England, have invented Improvements in Machines for Pressing and Making Hollow Earthenware Articles, (for which I have received the grant of Letters Patent in Great Britain, No. 17,068, dated October 25, 1890,) of which the following is a specification.

This invention relates to machines for pressing and making hollow earthenware articles and my present invention consists of certain improvements, alterations and additions in such machines as hereinafter set forth for the purpose of facilitating and expediting the making and "getting off" from the machine of the hollow earthenware vessels (potters' saggers, &c.) and to simplify and otherwise produce economy in the construction and working of such machines or apparatus.

In the course of long trials and numerous experiments I have found that the material or materials to be pressed up into shape are liable to stick to the parts of the apparatus with which such material comes in contact and in order to get off the made articles I proceed as follows:

According to my present invention I use an independent metal or other rim (which I term my "stripping" rim) operating in the space formed between the inner side of the mold and the outer side of a core such outer mold and inner core being fixed together and neither one movable upon the other—the stripping rim moving independently in the space formed between the said core and said mold and which together with the ram or head of the plunger (all hereinafter described) constitute the chamber in which hollow earthenware articles are formed. This stripping rim acts on the top of the hollow earthenware article as hereinafter set forth. This stripping rim is by means of connection such as steel rods (with or without springs or their equivalents) connected to and actuated by some moving part of the apparatus as hereinafter explained. The position of the moving member (*i. e.* the ram head or plunger) is under the mold and it will be obvious that—being connected with the aforesaid stripping rim on top edge of the sagger or vessel—on the ram head or plunger descending it will bring with it (by means of said rods and springs) the made piece or hollow-ware vessel and thus "strip" it from the mold and core between the inside of the former and the outside of the latter where it has been formed and so when the vessel is clear of the bottom edge of the mold it will by means of the rods and springs cause the said vessel or article to leave the rim also and thus be perfectly clear ready for moving away. A metal or other "loose board" is or may be used on top of the ram head or plunger and also linen brattice cloth, calico card-board or other flexible or suitable material (exfoliating or otherwise) may be used if desired—as hereinafter explained. The case or outer mold inside which is fixed the inner mold or core is continued below the level of said core or inner mold the space thus formed will on the insertion of the ram head or plunger (on which is placed the charge of clay) act as a closed up box and said clay is thereby effectually prevented from escaping. Thus the said ram head or plunger acts after the manner of a piston working into a cylinder and it also serves to guide the made piece (sagger, &c.) when being drawn off by the lowering of the ram and consequent action of the "stripper" *i. e.* the rim with rods and spring connections. Thus the ram head acts as feeder and presser and in conjunction with the stripper in its descent draws off the made piece (sagger, &c.) ready for removal the ram descending sufficiently to allow the sagger (or piece just made) in coming down to clear not only the fixed core or inner mold but also the bottom edge of the outer mold.

If desired any suitable air-valves or openings in the fixed core head (and in the ram head) may be used either with or without the addition of paper linen or other exfoliating material, and dry dust, sand, or "grog" or the like may be used in addition if desired.

Fitting on the top of the inner and outer molds a metal cover may be arranged through which and partly resting on it is a shaft collar, &c., on which is fixed a heavy cross head fastened to the body of the machine by means of long pins. This arrangement is for the purpose of bearing the strain of pressure from the ram when pressing saggers, &c.

Among other advantages the arrangement of feeding the machine from below the mold enables the sagger or hollow earthenware article to be made right-way-up ready for removal on the loose bottom board or plate hereinafter referred to.

Any desired motive power may be used but I may say I find hydraulic power is advantageous and convenient for actuating machines having my improvements applied thereto.

In order that my present invention may be easily understood and readily carried into practice I will proceed to describe same with reference to the accompanying sheet of drawings.

Figure 1 is a view in elevation of the complete apparatus. Fig. 2 is a vertical transverse section of Fig. 1. Fig. 3 is a cross section of the apparatus on line 1—1 Fig. 1. Fig. 4 is a cross section of the apparatus on the line 2—2 Fig. 1.

Similar letters of reference indicate corresponding parts throughout.

$a\ a$ is a supporting frame or standard supporting the hydraulic cylinder $b$.

$c$ is the ram having the ram head or plunger $d$ thereon of a shape corresponding with the inner contour of the mold $e$. The said mold $e$ is firmly mounted and carried in the standard $a$ by any suitable supports such as the cross head $f$.

$g$ is the inner core which core $g$ gives the ultimate shape to the inside of the sagger when made.

$h\ h$ are valves in the bottom part of the core $g$.

A space is left between the outer wall of the core $g$ and the inner side of the mold $e$ and in this space works the stripper rim $i$. This rim $i$ is carried by four (or it may be more or less) rods $j$—each such rod $j$ is respectively connected by means of a lug $k$ to an exterior rod $m$ these four rods $m$ being all firmly connected together at the top by a cross head $n$ while at their lower ends they are rigidly mounted and secured in any suitable manner to the ram or plunger $c\ d$. In Fig. 4 is shown a method of suitably mounting such connecting rods $m$ by means of connections $o$ which are firmly secured to the under side of the ram head $d$ see Fig. 2. At the point where the rods $j$ are connected to the exterior rods $m$ a shoulder is formed on each said rod $m$ and a spring $p$ is inserted between the lug $k$ and the cross head $n$ or top of the rod $m$ so that while the said shoulder on $m$ carries the lug $k$ up with it—yet on the descent of the ram head $d$ and the exterior rods $m$ connected thereto the said springs $p$ will be compressed and will thus allow a limited movement of the rods $m$ through the lugs $k$ and so allow a certain amount of play in the descending action of the rim $i$.

The operation is as follows:—The material to be molded into shape is placed (on a "loose board" which exactly corresponds with the contour of the plunger or ram head $d$) on the plunger $d$ and the power is then applied. The plunger $d$ rises up and enters the lower mouth of the mold $e$. The material on the plunger $d$ is pressed against the bottom part of the core $g$ and is thus squeezed outward and thus enters and is forced up the space between $e$ and $g$ and so forms the side walls of the made piece or sagger. The length of the upward travel of the ram $c$ is automatically limited (in any suitable manner—for instance by adjustable stop pieces on the plunger or ram) so that the plunger $d$ is automatically stopped at a regulated distance from the under side of the core $g$ the distance between the under side of $g$ and the plunger $d$ being the thickness required for the bottom part of the sagger. The ram $c$ and plunger $d$ are now caused to descend and the sagger or made piece descends with the plunger $d$ while the "stripper" now comes into action the rim $i$ pressing down all around the top edge of the side wall of the sagger or made piece and so stripping or clearing such thin side wall of the sagger or made piece out of the narrow space between the mold $e$ and the core $g$ (until such sagger is quite clear of the lower edge of the mold $e$) and thus preventing injury to the made piece or sagger in getting it out of the mold after pressing.

The "loose board" to fit on top of the plunger $d$ may be retained in its temporary position on such plunger by having V-shaped projections on the under side thereof to fit into corresponding V-shaped grooves in the plunger head or by means of projecting pins to enter holes or by other suitable means.

The rim $i$ may be suitably shaped on its under side so as to give any desired shape to the top edge of the sagger or made piece—if required. Also any suitable shape may be formed around the outer edge of the loose board so as to impart such shape around the edge on the under side of the sagger or made piece—if desired.

In order to vary the densities of the sagger, &c., and also to facilitate the pressing up of the sagger the "feed" may if desired be inserted at two separate operations and also the proportions of grog and clay may be varied at such separate feeds to suit particular requirements.

An obvious modification of my present invention consists in arranging such apparatus as a twin machine; that is, simply duplicating the apparatus. Also if desired the plunger or lower part $d$ with the "stripper" mechanism attached may be fixed and the mold and core part made and arranged as the moving member to descend upon such fixed head or plunder $d$—the "stripper" thus acting as before to force the made piece out of the mold.

As a further modification the stripper might be mounted independently of the ram or plunger—that is the "stripper" would be actuated separately and by separate power quite independent of the plunger or lower moving member but acting in unison therewith.

Having thus described my invention, what I claim as new, and desire to secure by Letters Patent of the United States, is—

1. In a machine for pressing and making hollow earthenware articles the combination of an outer mold and inner core fixed together and neither one movable upon the other with a stripping rim adapted to move independently in the space formed between the said core and said mold.

2. A stripping rim adapted to operate in the space formed between the inner side of the mold and the outer side of the core which together with the ram or plunger constitute the chamber in which hollow earthenware articles are formed.

3. The combination with a ram or plunger or other moving member of a stripping rim adapted to move and to operate independently in the space formed between the inner side of the mold and the outer side of the core thereof such core and mold being fixed with regard to one another and neither one being movable upon or in the other substantially in the manner and for the purposes hereinbefore set forth.

JOSEPH PULLAN GUY.

Witnesses:
 JESSE VAIRS,
  *Solicitor, Burslem.*
 JOHN HENRY COPESTAKE,
  *Park Rd., Burslem.*